(12) United States Patent
Jang et al.

(10) Patent No.: US 7,892,514 B2
(45) Date of Patent: Feb. 22, 2011

(54) METHOD OF PRODUCING NANO-SCALED GRAPHENE AND INORGANIC PLATELETS AND THEIR NANOCOMPOSITES

(75) Inventors: Bor Z. Jang, Centerville, OH (US); Aruna Zhamu, Centerville, OH (US)

(73) Assignee: Nanotek Instruments, Inc., Dayton, OH (US)

( * ) Notice: Subject to any disclaimer, the term of this patent is extended or adjusted under 35 U.S.C. 154(b) by 392 days.

(21) Appl. No.: 11/709,274

(22) Filed: Feb. 22, 2007

(65) Prior Publication Data

US 2008/0206124 A1   Aug. 28, 2008

(51) Int. Cl.
*C01B 31/00* (2006.01)

(52) U.S. Cl. .................. 423/415.1; 264/42; 423/460; 423/509; 423/562; 423/447.1; 423/447.3; 423/445 B; 423/448; 423/439; 252/378 R

(58) Field of Classification Search .............. 264/42; 423/415.1, 460, 448, 509, 562, 594.17, 594.18, 423/594.19, 604–608, 610, 617, 622, 632, 423/447.1, 447.3, 445 B, 439; 252/378 R See application file for complete search history.

(56) References Cited

U.S. PATENT DOCUMENTS

| | | | |
|---|---|---|---|
| 2,798,878 A | | 7/1957 | Hummers |
| 3,404,061 A | * | 10/1968 | Bochman et al. ............ 428/143 |
| 3,434,917 A | | 3/1969 | Kraus et al. |
| 3,885,007 A | | 5/1975 | Olsen et al. |
| 4,091,083 A | | 5/1978 | Hirschvogel et al. |
| 4,244,934 A | | 1/1981 | Kondo et al. |

(Continued)

OTHER PUBLICATIONS

Behrens, P.; Woebs, V.; Jopp, J.; Metz, W.; "Syntehsis and Characterization of the Graphite Intercalation Compounds of Bismuth Trichloride". Carbon. 2695). 641-646 (1988).*

(Continued)

*Primary Examiner*—Stuart Hendrickson
*Assistant Examiner*—Richard M Rump
(74) *Attorney, Agent, or Firm*—Mark P. Levy

(57) ABSTRACT

Disclosed is a method of exfoliating a layered material (e.g., graphite and graphite oxide) to produce nano-scaled platelets having a thickness smaller than 100 nm, typically smaller than 10 nm, and often between 0.34 nm and 1.02 nm. The method comprises: (a) subjecting the layered material in a powder form to a halogen vapor at a first temperature above the melting point or sublimation point of the halogen at a sufficient vapor pressure and for a duration of time sufficient to cause the halogen molecules to penetrate an interlayer space of the layered material, forming a stable halogen-intercalated compound; and (b) heating the halogen-intercalated compound at a second temperature above the boiling point of the halogen, allowing halogen atoms or molecules residing in the interlayer space to exfoliate the layered material to produce the platelets. Alternatively, rather than heating, step (a) is followed by a step of dispersing the halogen-intercalated compound in a liquid medium which is subjected to ultrasonication for exfoliating the halogen-intercalated compound to produce the platelets, which are dispersed in the liquid medium. The halogen can be readily captured and re-used, thereby significantly reducing the impact of halogen to the environment. The method can further include a step of dispersing the platelets in a polymer or monomer solution or suspension as a precursor step to nanocomposite fabrication.

14 Claims, 5 Drawing Sheets

U.S. PATENT DOCUMENTS

| | | | |
|---|---|---|---|
| 4,645,620 A * | 2/1987 | Palchan et al. | 252/502 |
| 4,822,590 A | 4/1989 | Morrison et al. | |
| 4,895,713 A | 1/1990 | Greinke et al. | |
| 5,503,717 A | 4/1996 | Kang | |
| 5,622,683 A * | 4/1997 | Hung | 423/414 |
| 5,698,088 A | 12/1997 | Kang | |
| 6,287,694 B1 | 9/2001 | Zaleski et al. | |
| 6,872,330 B2 | 3/2005 | Mack et al. | |
| 7,071,258 B1 | 7/2006 | Jang et al. | |
| 7,105,108 B2 * | 9/2006 | Kaschak et al. | 252/378 R |
| 2004/0033189 A1 * | 2/2004 | Kaschak et al. | 423/448 |
| 2005/0271574 A1 * | 12/2005 | Jang et al. | 423/448 |

OTHER PUBLICATIONS

Martin, W. H. and Brocklehurst, J. E., "The Thermal Expansion Behavior of Pyrolitic Graphite-Bromine Residue Compounds," Carbon, 1, 133-141 (1964).

* cited by examiner

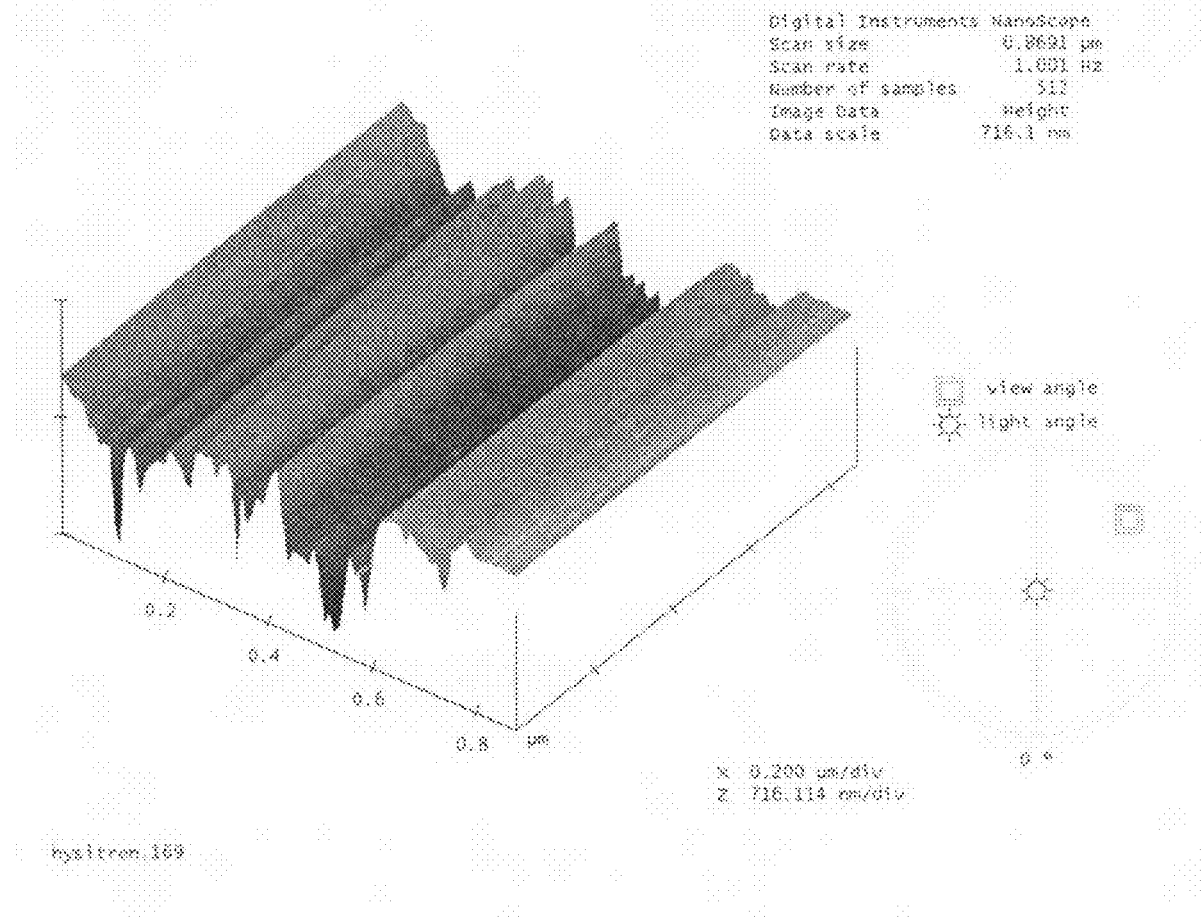

METHOD OF PRODUCING NANO-SCALED GRAPHENE AND INORGANIC PLATELETS AND THEIR NANOCOMPOSITES

This invention is based on the research result of a US Department of Energy (DoE) Small Business Innovation Research (SBIR) project. The US government has certain rights on this invention.

FIELD OF THE INVENTION

The present invention relates generally to a method of producing nano-scaled plate-like or sheet-like structures and their nanocomposites and, particularly, to nano-scaled graphene platelets (NGPs), graphite oxide platelets, inorganic platelets, and nano-scaled platelet-reinforced nanocomposites.

BACKGROUND

Carbon is known to have four unique crystalline structures, including diamond, graphite, fullerene and carbon nanotubes. The carbon nano-tube (CNT) refers to a tubular structure grown with a single wall or multi-wall, which can be conceptually obtained by rolling up a graphene sheet or several graphene sheets to form a concentric hollow structure. A graphene sheet is composed of carbon atoms occupying a two-dimensional hexagonal lattice. Carbon nano-tubes have a diameter on the order of a few nanometers to a few hundred nanometers. Carbon nano-tubes can function as either a conductor or a semiconductor, depending on the rolled shape and the diameter of the tubes. Its longitudinal, hollow structure imparts unique mechanical, electrical and chemical properties to the material. Carbon nano-tubes are believed to have great potential for use in field emission devices, hydrogen fuel storage, rechargeable battery electrodes, and composite reinforcements.

However, CNTs are extremely expensive due to the low yield and low production and purification rates commonly associated with all of the current CNT preparation processes. The high material costs have significantly hindered the widespread application of CNTs. Rather than trying to discover much lower-cost processes for nano-tubes, we have worked diligently to develop alternative nano-scaled carbon materials that exhibit comparable properties, but can be produced in larger quantities and at much lower costs. This development work has led to the discovery of processes for producing individual nano-scaled graphite planes (individual graphene sheets) and stacks of multiple nano-scaled graphene sheets, which are collectively called "nano-scaled graphene plates (NGPs)." NGPs could provide unique opportunities for solid state scientists to study the structures and properties of nano carbon materials. The structures of these materials may be best visualized by making a longitudinal scission on the single-wall or multi-wall of a nano-tube along its tube axis direction and then flattening up the resulting sheet or plate. Studies on the structure-property relationship in isolated NGPs could provide insight into the properties of a fullerene structure or nano-tube. Furthermore, these nano materials could potentially become cost-effective substitutes for carbon nano-tubes or other types of nano-rods for various scientific and engineering applications.

Direct synthesis of the NGP material had not been possible, although the material had been conceptually conceived and theoretically predicted to be capable of exhibiting many novel and useful properties. Jang and Huang have provided an indirect synthesis approach for preparing NGPs and related materials [B. Z. Jang and W. C. Huang, "Nano-scaled Graphene Plates," U.S. Pat. No. 7,071,258 (Jul. 4, 2006)]. Another process developed by B. Z. Jang, et al. ["Process for Producing Nano-scaled Graphene Plates," U.S. patent pending, Ser. No. 10/858,814 (Jun. 3, 2004)] involves (1) providing a graphite powder containing fine graphite particles (particulates, short fiber segments, carbon whisker, graphitic nano-fibers, or combinations thereof) preferably with at least one dimension smaller than 1 μm); (2) exfoliating the graphite crystallites in these particles in such a manner that at least two graphene planes are either partially or fully separated from each other, and (3) mechanical attrition (e.g., ball milling) of the exfoliated particles to become nano-scaled to obtain NGPs. The starting powder type and size, exfoliation conditions (e.g., intercalation chemical type and concentration, temperature cycles, and the mechanical attrition conditions (e.g., ball milling time and intensity) can be varied to generate, by design, various NGP materials with a wide range of graphene plate thickness, width and length values. Ball milling is known to be an effective process for mass-producing ultra-fine powder particles. The processing ease and the wide property ranges that can be achieved with NGP materials make them promising candidates for many important industrial applications. The electronic, thermal and mechanical properties of NGP materials are expected to be comparable to those of carbon nano-tubes; but NGP will be available at much lower costs and in larger quantities.

In this and other methods for making separated graphene or other non-carbon inorganic platelets, the process begins with intercalating lamellar flake particles with an expandable intercalation agent (intercalant), followed by expanding the intercalant to exfoliate the flake particles. Conventional intercalation methods and recent attempts to produce exfoliated products or separated platelets are given in the following representative references:

1. J. W. Kraus, et al., "Preparation of Vermiculite Paper," U.S. Pat. No. 3,434,917 (Mar. 25, 1969).
2. L. C. Olsen, et al., "Process for Expanding Pyrolytic Graphite," U.S. Pat. No. 3,885,007 (May 20, 1975).
3. A. Hirschvogel, et al., "Method for the Production of Graphite-Hydrogensulfate," U.S. Pat. No. 4,091,083 (May 23, 1978).
4. T. Kondo, et al., "Process for Producing Flexible Graphite Product," U.S. Pat. No. 4,244,934 (Jan. 13, 1981).
5. R. A. Greinke, et al., "Intercalation of Graphite," U.S. Pat. No. 4,895,713 (Jan. 23, 1990).
6. F. Kang, "Method of Manufacturing Flexible Graphite," U.S. Pat. No. 5,503,717 (Apr. 2, 1996).
7. F. Kang, "Formic Acid-Graphite Intercalation Compound," U.S. Pat. No. 5,698,088 (Dec. 16, 1997).
8. P. L. Zaleski, et al. "Method for Expanding Lamellar Forms of Graphite and Resultant Product," U.S. Pat. No. 6,287,694 (Sep. 11, 2001).
9. J. J. Mack, et al., "Chemical Manufacture of Nanostructured Materials," U.S. Pat. No. 6,872,330 (Mar. 29, 2005).
10. Morrison, et al., "Forms of Transition Metal Dichalcogenides," U.S. Pat. No. 4,822,590 (Apr. 18, 1989).

One common feature of these methods is the utilization of liquid or solution-based chemicals to intercalate graphite or other inorganic flake particles. These chemicals often comprise strong acids (e.g., sulfuric and nitric acids), solvents, or other undesirable species that can reside in the material. For instance, the most commonly used method of graphite intercalation for the production of expandable graphite in industry involves immersing graphite in a mixture of sulfuric and nitric acids, to which is added some sodium perchlorate, followed by HCl treatments and a lengthy water rinsing steps. In another example, Mack, et al. [Ref. 9] intercalated laminar materials with alkali metals (e.g. Li, Na, K, Rb, and Cs), alkaline earth metals (e.g. Mg, Ca, Sr, and Ba), Eu, Yb, or Ti. Intercalation of these elements was accomplished by five different routes: (1) intercalated electrochemically using a non-aqueous solvent; (2) using an alkali plus naphthalene or benzophenone along with a non-aqueous solvent (usually an ether such as tetrahydrofuran); (3) using amalgams (metal+mercury); (4) dissolving any of the afore-mentioned metals in a liquid ammonia solution to create solvated ions; and (5) using n-butyl lithium in a hydrocarbon solvent (e.g., hexane).

In addition to the utilization of undesirable chemicals, in most of these methods of graphite intercalation and exfoliation, a tedious washing step is required, which produces contaminated waste water that requires costly disposal steps. Furthermore, conventional exfoliation methods normally involve a very high furnace temperature (typically between 500° C. and 2,500° C.) since the process depends on the decomposition of an intercalant (e.g., $NO_3^{-1}$ and $SO_4^{-2}$) to form expandable gaseous species (e.g., $SO_2$ and $NO_x$). In another approach, intercalation with an alkali or alkaline earth metal entails immersing the layered material in a metal compound solution (rather than pure metal), allowing the metal ions to penetrate into the inter-layer galley (interstitial space). Typically, metal ion content is relatively low compared to other elements in such a compound solution (e.g., in a solution of 20% by weight lithium chloride in water, lithium content is only 3.27% by weight). Hence, only a small amount of ions from a relatively dilute solution penetrates and stays sporadically in these spaces. The resulting exfoliated product often exhibits platelets of widely varying thicknesses and many incompletely delaminated layers. Direct intercalation of graphite with a pure alkali metal is possible [Ref. 9], but has been limited to a laboratory operation (inside a dry glove box, for instance filled with an inert gas) due to the fact that alkali metals such as Li, Na, and K are extremely sensitive to even a trace amount of water and react very violently with water. Such a process is not amenable to mass production of nano-scaled platelets.

In one of our earlier inventions [B. Z. Jang, A. Zhamu, and J. Guo, "Process for Producing Nano-scaled Platelets and Nanocomposites," U.S. patent application Ser. No. 11/509,424 (Aug. 25, 2006)], a process was provided for exfoliating a layered (laminar) material to produce nano-scaled platelets. The process comprises: (a) subjecting a layered material to a gaseous environment at a first temperature and first pressure sufficient to cause gas species to penetrate (into the interstitial space, also referred to as the interlayer galley) between layers of the layered material, forming a gas-intercalated layered material; and (b) subjecting the gas-intercalated layered material to a second pressure, or a second pressure and a second temperature, allowing gas species to pressurize and expand the interstitial space between layers (and to partially or completely escape from the layered material), thereby exfoliating the layered material to produce the platelets. A high first pressure was used to facilitate penetration of gas species into the interlayer galley to form a tentative gas-intercalated compound. A typically much higher second temperature (than the first temperature) was used to pressurize the interlayer galley. A very short period of time (typically seconds) elapsed between step (a) (once the gas pressure is relieved) and step (b). The gas molecules or atoms reside in the interlayer galley only on a temporary basis and can easily leave the interlayer galley without causing exfoliation if step (b) is not conducted immediately or soon after intercalation. The gas species used in this earlier study included hydrogen, helium, neon, argon, nitrogen, oxygen, fluorine, carbon dioxide, or a combination thereof. These molecules or atoms have one thing in common: having an extremely low melting point and low boiling point (typically lower than −150° C. with the exception of $CO_2$, which has a boiling point of −78° C. and melting point of −57° C.). At room temperature, they are all highly volatile gases and are kinetically too active to stay in the interlayer galley of a layered material (e.g. graphite) for an extended period of time. Hence, they are not capable of forming a stable graphite intercalation compound (GIC).

By contrast, the present inventors, after an intensive study, have come to discover that selected halogen molecules such as bromine ($Br_2$), iodine ($I_2$), iodine chloride (ICl), iodine bromide (IBr), bromine chloride (BrCl if maintained at T<5° C.), iodine pentafluoride ($IF_5$), bromine trifluoride ($BrF_3$), chlorine trifluoride ($ClF_3$, if maintained at T<11.8° C.), or a combination thereof can be used to intercalate a range of layered materials to form stable intercalation compounds at room temperature. The resulting intercalation compounds could remain stable for a long time (e.g., bromine-intercalated natural graphite remains stable for many months), enabling the compound to be exfoliated when and where the platelets are needed. The halogen molecules or compounds in a vaporous state are capable of forming low-stage intercalated compounds (e.g., stage 1, 2, 3, 4 and 5). For the intercalated graphite, stage n implies that there are n graphene sheets between two intercalant layers (typically each intercalant layer inside an interlayer galley is a monolayer of intercalant molecules or atoms). After exfoliation of intercalated graphite particles of stage 1, 2, and 3, for instance, the resulting platelets tend to be single-sheet, double-sheet, and triple sheet graphene platelets. The presently invented method has an excellent control over the nano platelet thickness. Furthermore, most of the halogen molecules can be recovered and re-used. We have further found that the resulting nano-scaled platelets can be readily dispersed in a range of liquid media, making it possible to prepare nanocomposites. The same method is also found to be suitable for the production of other nano-scaled inorganic platelets, for instance, dichalcogenides, such as $MoS_2$, which have found applications as electrodes in lithium ion batteries and as hydro-desulfurization catalysts.

It may be noted that Martin, et al. [W. H. Martin and J. E. Brocklehurst, "The Thermal Expansion Behavior of Pyrolitic Graphite-Bromine Residue Compounds," Carbon, 1 (1964) 133-141] observed the "breakaway" expansion of pyrolytic graphite-bromine residue compound. For unknown reasons, their bromine-intercalated pyrolytic graphite compounds appear to be unstable with a majority of bromine escaping from graphite upon completion of intercalation, leaving behind at most a Br/C atomic ratio of 4%. Hence, only a limited amount of bromine remained in a limited number of interlayer spaces of a graphite sample. This amount and number were sufficient to induce delamination of only a limited number of layers (there is a large number of graphene layers between two delaminations). As a consequence, the irreversible expansion of these graphite-bromine residue compounds resulted in a low-extent, incomplete exfoliation only. The resulting platelets are not fully separated and are not nanometer-scaled.

It is therefore an object of the present invention to provide an environmentally benign method of exfoliating a laminar (layered) compound or element, such as graphite, graphite oxide, and transition metal dichalcogenides, without using undesirable intercalating chemicals.

It is another object of the present invention to provide a convenient method of exfoliating a laminar compound or element to produce nano-scaled platelets (platelets with a thickness smaller than 100 nm, mostly smaller than 10 nm, typically smaller than 1 nm) where and when these platelets are needed.

It is still another object of the present invention to provide a method of producing nano-scaled platelets that can be readily dispersed in a liquid to form a nanocomposite structure.

Another object of the present invention is to provide a relatively low-temperature process for producing nano-scaled platelets with relatively uniform thicknesses.

SUMMARY OF THE INVENTION

The present invention provides a method of exfoliating a layered material (e.g., graphite and graphite oxide) to produce nano-scaled platelets having a thickness smaller than 100 nm, typically smaller than 10 nm, and often between 0.34 nm and 1.02 nm. The method comprises: (a) subjecting the layered material in a powder form to a halogen vapor (including diatomic halogen molecules, inter-halogen compound molecules, and phosphorus-halogen compounds) at a first temperature above the melting point or sublimation point of the halogen for a duration of time sufficient to cause the halogen to penetrate an interlayer space of the layered material, forming a stable halogen-intercalated compound; and (b) heating the halogen-intercalated compound at a second temperature above the boiling point of the halogen, allowing halogen atoms or molecules residing in the interlayer space to exfoliate the layered material to produce the platelets. Alternatively, rather than heating, step (b) is replaced by a step of mixing the halogen-intercalated compound in a liquid medium which is subjected to ultrasonication for exfoliating the halogen-intercalated compound to produce the platelets, which are also well-dispersed in the liquid medium due to ultrasonic effects. The halogen can be readily captured and re-used, thereby significantly reducing the potential impact of halogen to the environment. The method can further include a step of dispersing the platelets in a polymer or monomer solution or suspension as a precursor step to nanocomposite fabrication.

The starting layered material preferably comprises small particles with a dimension smaller than 10 μm and more preferably smaller than 1 μm. The halogen is selected from the group consisting of diatomic halogen molecules, inter-halogen compounds, phosphorus-halogen compounds, and combinations thereof. Preferably, halogen is selected from bromine ($Br_2$), iodine ($I_2$), iodine chloride (ICl), iodine bromide (IBr), bromine chloride (BrCl), iodine pentafluoride ($IF_5$), bromine trifluoride ($BrF_3$), chlorine trifluoride ($ClF_3$), phosphorus trichloride ($PCl_3$), phosphorus tetrachloride ($P_2Cl_4$), phosphorus tribromide ($PBr_3$), phosphorus triiodide ($PI_3$), or a combination thereof. The method may include an additional step of applying air milling, ball milling, mechanical attrition, and/or sonification to further separate the platelets and/or reduce a size of the platelets. The resulting platelets typically have a thickness smaller than 10 nm and many have a thickness smaller than 1 nm. For graphite flakes, the resulting graphene platelets typically contain one to five layers of graphite planes or graphene sheets with each layer of approximately 0.34 nm (3.4 Å) thick. For graphite oxide flakes, each layer or sheet is approximately 0.64 nm to 1.02 nm in thickness (depending upon the degree of oxidation), but more typically close to 0.74 nm.

The layered material could be natural graphite, synthetic graphite, highly oriented pyrolytic graphite, graphite oxide, graphite fluoride, pre-intercalated graphite, pre-intercalated graphite oxide, graphite or carbon fiber, graphite nano-fiber, or a combination thereof. It could comprise a layered inorganic compound selected from a) clay; b) bismuth selenides or tellurides; c) transition metal dichalcogenides; d) sulfides, selenides, or tellurides of niobium, molybdenum, hafnium, tantalum, tungsten or rhenium; e) layered transition metal oxides; f) graphite or graphite derivatives; g) pre-intercalated compounds, or a combination thereof.

The step of intercalation preferably comprises enclosing the layered material in a first chamber and the halogen in a second chamber of an ampoule. The two chambers are in vapor communication with each other. Preferably, the second chamber is at a lower temperature than the first chamber.

Certain nano-scaled platelets (e.g., graphite oxides) are hydrophilic in nature and, therefore, can be readily dispersed in selected solvents (e.g., water). Hence, the invented method can include an additional step of dispersing the platelets in a liquid to form a suspension or in a monomer- or polymer-containing solvent to form a nanocomposite precursor suspension. This suspension can be converted to a mat or paper (e.g., by following a paper-making process). The nanocomposite precursor suspension may be converted to a nanocomposite solid by removing the solvent or polymerizing the monomer. Alternatively, the platelets may be mixed with a monomer or polymer to form a mixture, which can be converted to obtain a nanocomposite solid. In the case of graphite oxide or graphite fluoride platelets, the method may further include a step of partially or totally reducing the graphite oxide or fluoride (after the formation of the suspension) to become graphite (serving to recover at least partially the high conductivity that a pristine graphite would have).

DETAILED DESCRIPTION OF PREFERRED EMBODIMENTS

Figure 1:
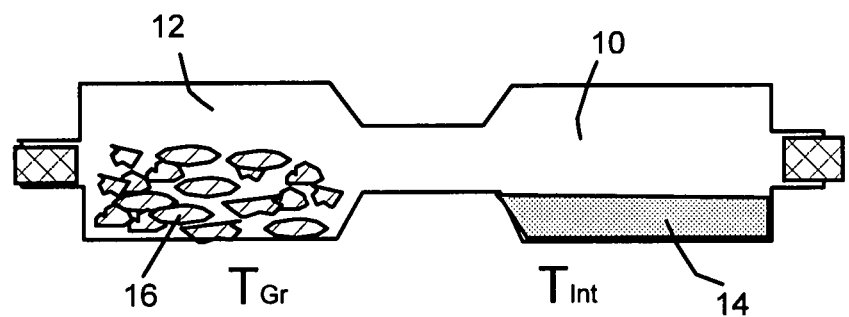
FIG. 1 Schematic of an apparatus that can be used to intercalate a layered material as a first step to produce nano-scaled platelets such as nano-scaled graphene plates (NGPs).

One preferred specific embodiment of the present invention is a method of producing a nano-scaled graphene plate (NGP) material that is essentially composed of a sheet of graphene plane or multiple sheets of graphene plane stacked and bonded together. Each graphene plane, also referred to as a graphene sheet or basal plane, comprises a two-dimensional hexagonal structure of carbon atoms. Each plate has a length and a width parallel to the graphite plane and a thickness orthogonal to the graphite plane. The thickness of an NGP is 100 nanometers (nm) or smaller and more typically thinner than 10 nm with a single-sheet NGP being as thin as 0.34 nm. The length and width of a NGP could exceed 1 μm. Preferably, for certain applications, both length and width are smaller than 1 μm. Graphite is but one of the many examples of laminar or layered materials that can be exfoliated to become nano-scaled platelets. A layered inorganic compound may be selected from (a) clay; (b) bismuth selenides or tellurides; (c) transition metal dichalcogenides; (d) sulfides, selenides, or tellurides of niobium, molybdenum, hafnium, tantalum, tungsten or rhenium; (e) layered transition metal oxides; (f) graphite or graphite derivatives; (g) pre-intercalated compounds, or a combination thereof. The presently invented method works for all of these classes of laminar materials.

Generally speaking, a method has been developed for intercalating and exfoliating a layered or laminar material to produce nano-scaled platelets having a thickness smaller than 100 nm. The method comprises step (a), an intercalation step, and step (b), an exfoliation step or combined exfoliation/separation step. Step (a) entails subjecting the layered material in a powder form to a halogen vapor at a first temperature above the melting point or sublimation point of the halogen (typically below the boiling point of the halogen, but can be higher than the boiling point) under a sufficient vapor pressure and for a duration of time sufficient to cause the halogen vapor to penetrate an interlayer space of the layered material, forming a stable halogen-intercalated compound. In one preferred embodiment, step (b) comprises heating the halogen-intercalated compound at a second temperature above the boiling point of the halogen, allowing halogen atoms or molecules residing in the interlayer space to exfoliate the layered material to produce the platelets.

Alternatively, rather than heating, step (b) comprises mixing the halogen-intercalated compound in a liquid medium and subjecting the compound-liquid mixture (a slurry) to an ultrasonic energy treatment (ultrasonication). It was quite surprising that ultrasonication alone was capable of exfoliating the halogen-intercalated compound to produce well-separated platelets and, concurrently, dispersing the platelets in the liquid medium. This is a particularly desirable feature due to the fact that, during the whole process, the layered material never gets to experience a temperature higher than 250° C. (typically lower than 150° C.) and, hence, is not subject to oxidation or other undesirable chemical reaction. For instance, graphite is known to be subject to oxidation at 350° C. or higher. Upon oxidation, graphite would suffer from a dramatic loss in electrical and thermal conductivity. The presently invented method obviates the need or possibility to expose the layered material to an oxidizing, high-temperature environment.

The halogen preferably is selected from bromine ($Br_2$), iodine ($I_2$), iodine chloride (ICl), iodine bromide (IBr), bromine chloride (BrCl), iodine pentafluoride ($IF_5$), bromine trifluoride ($BrF_3$), chlorine trifluoride ($ClF_3$), or a combination thereof. Fluorine ($F_2$) or chlorine ($Cl_2$) by itself does not form a stable intercalation compound with graphite, but is able to do so when a combination of fluorine or chlorine with bromine is used as an intercalation vapor. The halogen can be readily captured and re-used, thereby significantly reducing the potential impact of halogen to the environment. In the case of heat-induced exfoliation, the halogen molecules that leave the layered compound can be captured conveniently by condensation since their boiling points are typically higher than room temperature. One exception is BrCl having a boiling point of 5° C. and, hence, the condensation temperature is lower than 5° C., which is also easy to achieve. In the case of ultrasonication-induced exfoliation/separation, the released halogen molecules are naturally mixed with the liquid medium and can be recovered via distillation.

Typically and preferably, the halogen species present in a stable halogen-intercalated compound has a concentration of at least 5% in terms of the atomic ratio of halogen-to-host molecule. For instance, for the graphite intercalated with bromine or iodine, the Br/C or I/C ratio exceeds 5% and, most preferably, reaches a level of 12.5%, corresponding to $C_8Br$ or $C_8I$. For BrCl-intercalated $MoS_2$, the total (Br+Cl)/(Mo+S) atomic ratio preferably exceeds 5% and, most preferably, exceeds 8%. For the cases of graphite or graphite oxide, a higher halogen content (e.g., close to $C_8I$) implies a lower stage index, resulting in the formation of graphene or graphite oxide platelets that are single-sheet, double-sheet, and triple-sheet, etc.

In a preferred embodiment, referring to FIG. 1, the step (a) of intercalation entails placing the layered material 16 in a chamber 12 of a sealed vessel with a halogen liquid 14 or solid placed in another chamber 10 of the same sealed vessel. The halogen is at a first temperature $T_{Int}$, which is higher than the melting point or sublimation point (typically near room temperature), sufficient to produce a required halogen vapor pressure. Although iodine has a melting point of 113.7° C., it begins to sublime at room temperature and provides an adequate vapor pressure at 100-180° C. Preferably, the first chamber 12 is at a temperature ($T_{Gr}$) slightly higher than $T_{Int}$ to induce a halogen vapor flow from the second chamber 10 to the first chamber 12 and to prevent condensation of halogen on the layered material sample. The vessel can be internally or externally heated to provide controlled temperatures. The starting layered material preferably comprises small particles with a dimension smaller than 10 μm and more preferably smaller than 1 μm to reduce the required intercalation time.

For the case of halogen intercalation into graphite, graphite oxide, or graphite fluoride, typical intercalation temperatures are close to room temperature. The only two diatomic homopolar halogen molecules that intercalate readily into graphite are $Br_2$ and $I_2$ to form stable intercalated compounds, although intercalation with $F_2$ and $Cl_2$ can also be carried out if they are mixed with $Br_2$ to form a mixture intercalant. In addition to these homopolar diatomic molecules, inter-halogen molecules such as iodine chloride (ICl), iodine bromide (IBr), bromine chloride (BrCl), iodine pentafluoride ($IF_5$), bromine trifluoride ($BrF_3$), and chlorine trifluoride ($ClF_3$) are also found to be effective in forming intercalation compounds with a wide range of layered materials, including (a) clay; (b) bismuth selenides or tellurides; (c) transition metal dichalcogenides; (d) sulfides, selenides, or tellurides of niobium, molybdenum, hafnium, tantalum, tungsten or rhenium; (e) layered transition metal oxides; (f) graphite, graphite oxide, and graphite fluoride. Also effective are phosphorus-halogen compounds such as phosphorus trichloride ($PCl_3$), phosphorus tetrachloride ($P_2Cl_4$), phosphorus tribromide ($PBr_3$), and phosphorus triiodide ($PI_3$).

The intercalation temperature and pressure conditions are not particularly stringent. For instance, in the case of $Br_2$ intercalation of graphite and other inorganic compounds, stable halogen-intercalated compounds were readily obtainable at $T_{Gr}$=20° C. and −7° C.<$T_{Int}$<20° C. in 1-3 days. Liquid bromine was inserted into chamber 10 (FIG. 1), which was placed in a temperature-controlled (refrigerated) alcohol bath. For graphite, after 48 hours, a stable Br-intercalated graphite compound was obtained, which was transferred to a furnace preheated to 200° C. Graphite was exfoliated to a great extent and the resulting platelets tend to contain 2-10 graphene sheets.

Table 1 provides a partial list of halogen-based intercalating agents that were investigated by the present inventors. These include diatomic halogen molecules, inter-halogen compounds, and phosphorus-halogen compounds. The molecules and compounds that were found to form a stable halogen-intercalated compound at room temperature have one common feature: they all have a boiling point above 0° C. (preferably above 25° C.) and a melting point below 25° C. (preferably below 0° C.). Ideally, they should be in a liquid state at room temperature and exhibit a high vapor pressure at a temperature not much higher than room temperature. This feature enables the intercalation process to be conducted without much heating or cooling, thereby saving energy and enabling mass production of halogen-intercalated compounds. Halogen molecules or compounds that have a boiling point much lower than 0° C. appear to be incapable of forming a stable halogen-intercalated compound, presumably due to the high volatility of these species in an interlayer space at room temperature. They can be an effective intercalation agent if combined with a high boiling point molecule or compound such as $Br_2$ or $I_2$. It may be noted that all the species listed in Table 1 have a boiling point lower than 230° C., most of them lower than 200° C., and many of them lower than 100° C. This implies that the resulting intercalated compounds need not be heated to an excessively high temperature for effective exfoliation (typically no more than 250° C., and mostly no more than 150° C.). This is in sharp contrast to acid-intercalated graphite or inorganic compounds that typically must be exfoliated at 800° C. or higher.

cally in the range of 80° C.-200° C.). At this temperature, the halogen species in the interlayer galley of a laminar material (e.g., graphite flakes) would vaporize and find themselves in a high pressure in the interlayer space. These vapor species appear to be capable of overcoming weak van der Waal's forces between layers, thereby delaminating or fully separating graphene planes in a graphite crystallite. Typically, the substantially complete and full expansion of the particles is accomplished within a duration of from a fraction of a second to about 2 minutes, more typically from 1 second to 20 seconds.

Microwave heating was found to be particularly effective and energy-efficient in heating to exfoliate fine, halogen-intercalated graphite or inorganic particles. It may take minutes for a microwave oven to heat and exfoliate a treated graphite sample, as opposed to seconds for the cases of pre-

TABLE 1

Halogen molecules used as an intercalating agent in the present study.

| Halogen (including interhalogen and phosphorus-halogen compounds) | Melting points (° C.) | Boiling point (° C.) | Recommended intercalant vapor temperature, $T_{Int}$ |
|---|---|---|---|
| $F_2$ (not recommended, unless combined with $Br_2$ or $I_2$) | −219.62 | −188.12 | −7° C. < $T_{Int}$ < 20° C. if used with $Br_2$ |
| $Cl_2$ (not recommended, unless combined with $Br_2$ or $I_2$) | −101.5 | −34.04 | −7° C. < $T_{Int}$ < 20° C. if used with $Br_2$ |
| $Br_2$ | −7.2 | 58.8 | −7° C. < $T_{Int}$ < 50° C. |
| $I_2$ | 113.7 (begins to sublime at 25° C.) | 184.4 | 100° C. < $T_{Int}$ < 150° C. |
| IF (not recommended) | −45 (disproportionates) | (Unstable at room temperature) | |
| $IF_5$ | 9.4 | 104.5 | 10° C. < $T_{Int}$ < 70° C. |
| BrF (not recommended) | −33 (disproportionates) | 20 (Unstable at room temperature) | |
| $BrF_3$ | 9 | 126 | −10 C. < $T_{Int}$ < 80° C. |
| ClF (not recommended) | −155.6 | −100 | |
| $ClF_3$ | −76.3 | 11.8 | −20° C. < $T_{Int}$ < 10° C. |
| ICl | 27 | 97 | 27° C. < $T_{Int}$ < 80° C. |
| IBr | 42-50 | 116 | 43° C. < $T_{Int}$ < 80° C. |
| BrCl | −66 | 5 | −10° C. < $T_{Int}$ < 0° C. |
| $PCl_3$ | −112 | 76 | 0° C. < $T_{Int}$ < 60° C. |
| $P_2Cl_4$ | −28 | 180 | 0° C. < $T_{Int}$ < 150° C. |
| $PBr_3$ | −41.5 | 173 | 0° C. < $T_{Int}$ < 150° C. |
| $PI_3$ | 61 | 227 | 61° C. < $T_{Int}$ < 180° C. |

Using graphite as an example, the first step may involve preparing a laminar material powder containing fine graphite particulates (granules) or flakes, short segments of carbon fiber (including graphite fiber), carbon or graphite whiskers, graphitic nano-fibers, or their mixtures. The length and/or diameter of these graphite particles are preferably less than 0.2 mm (200 μm), further preferably less than 0.01 mm (10 μm), and most preferably smaller than 1 μm. The graphite particles are known to typically contain micron- and/or nanometer-scaled graphite crystallites with each crystallite being composed of one sheet or several sheets of graphite plane. Preferably, large graphite particles are pulverized, chopped, or milled to become small particles or short fiber segments before being sealed in an intercalation chamber. The reduced particle sizes facilitate fast diffusion or migration of intercalating halogen molecules into the interstices between graphite planes in graphite crystallites.

The second step involves exfoliating the graphite crystallites in the graphite particles by placing the gas-intercalated laminar graphite in an oven at a pre-set temperature which is greater than the boiling point of the intercalant halogen (typiheating a furnace to a high temperature. However, the amount of energy required is much smaller for microwave heating.

Alternatively, rather than heating, step (b) is replaced by a step of mixing the halogen-intercalated compound in a liquid medium which is subjected to ultrasonication for exfoliating the halogen-intercalated compound to produce the platelets. Ultrasonic energy also enables the resulting platelets to be well dispersed in the liquid medium, producing a homogeneous suspension. The advantages of this route are that (a) exfoliation and dispersion are achieved in a single step; and (b) no high temperature is involved (no danger of oxidation). A monomer, oligomer, or polymer may be added to this suspension to form a suspension that is a precursor to a nanocomposite structure.

An optional third step includes subjecting the exfoliated material to a mechanical attrition treatment to further reduce the particle sizes for producing the desired nano-scaled platelets. With this treatment, either the individual graphene planes (one-layer NGPs) or stacks of graphene planes bonded together (multi-layer NGPs) are reduced to become nanometer-sized in width and/or length. In addition to the thickness dimension being nano-scaled, both the length and width of these NGPs could be reduced to smaller than 100 nm in size if so desired. In the thickness direction (or c-axis direction normal to the graphene plane), there may be a small number of graphene planes that are still bonded together through the van der Waal's forces that commonly hold the basal planes together in a natural graphite. Typically, there are less than 20 layers (often less than 5 layers) of graphene planes, each with length and width smaller than 1 µm (can be <100 nm), which constitute a multi-layer NGP material produced after mechanical attrition.

Attrition can be achieved by pulverization, grinding, ultra-sonication, milling, etc., but the most effective method of attrition is ball-milling. High-energy planetary ball mills were found to be particularly effective in producing nano-scaled graphene plates. Since ball milling is considered to be a mass production process, the presently invented method is capable of producing large quantities of NGP materials cost-effectively. This is in sharp contrast to the production and purification processes of carbon nano-tubes, which are slow and expensive.

The ball milling procedure, when down-sizing the particles, tend to produce free radicals at peripheral edges of graphene planes. These free radicals are inclined to rapidly react with non-carbon elements in the environment. These non-carbon atoms may be selected to produce desirable chemical and electronic properties. Of particular interest is the capability of changing the dispersibility of the resulting nano-scaled platelets in a liquid or matrix material for the purpose of producing nanocomposites. Non-carbon atoms typically include hydrogen, oxygen, nitrogen, sulfur, and combinations thereof.

Carbon materials can assume an essentially amorphous structure (glassy carbon), a highly organized crystal (graphite), or a whole range of intermediate structures that are characterized in that various proportions and sizes of graphite crystallites and defects are dispersed in an amorphous matrix. Typically, a graphite crystallite is composed of a number of graphene plates (sheets of graphene planes or basal planes) that are bonded together through van der Waals forces in the c-direction, the direction perpendicular to the basal plane. These graphite crystallites are typically micron- or nanometer-sized. The graphite crystallites are dispersed in or connected by crystal defects or an amorphous phase in a graphite particle, which can be a graphite flake, carbon/graphite fiber segment, or carbon/graphite whisker or nano-fiber. In the case of a carbon or graphite fiber segment, the graphene plates may be a part of a characteristic "turbostratic structure."

Once the nano platelets are produced, the platelets may be dispersed in a liquid to form a suspension or in a monomer- or polymer-containing solvent to form a nanocomposite precursor suspension. The process may include a step of converting the suspension to a mat or paper, or converting the nanocomposite precursor suspension to a nanocomposite solid. If the platelets in a suspension comprise graphite oxide or graphite fluoride platelets, the process may further include a step of partially or totally reducing the graphite oxide or fluoride after the formation of the suspension.

Alternatively, the resulting platelets may be mixed with a monomer to form a mixture, which can be polymerized to obtain a nanocomposite solid. The platelets can be mixed with a polymer melt to form a mixture that is subsequently solidified to become a nanocomposite solid.

Figure 2:
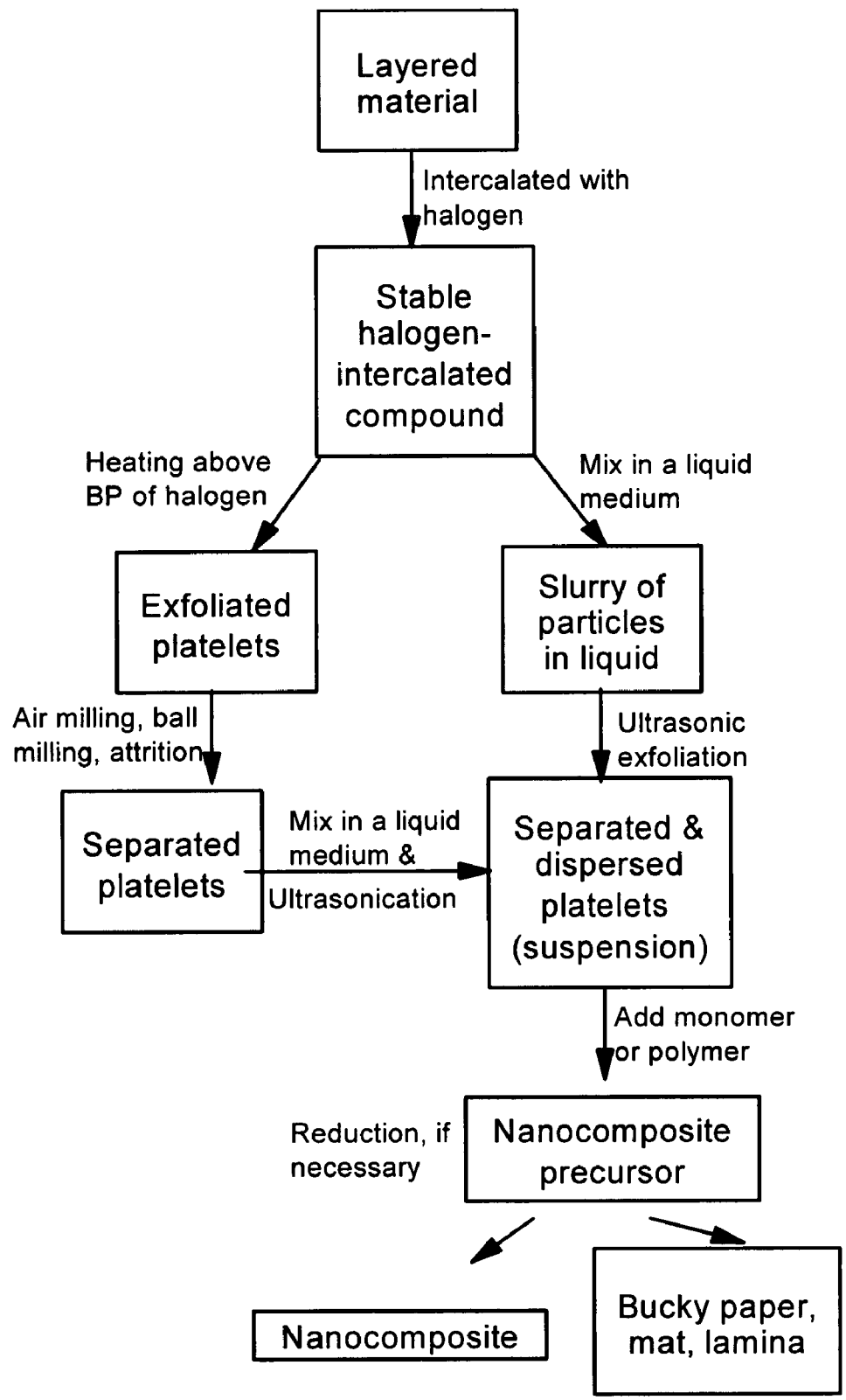
FIG. 2 A flow chart showing preferred routes to preparing nano-scaled platelets and their nanocomposites.
Figure 3B:
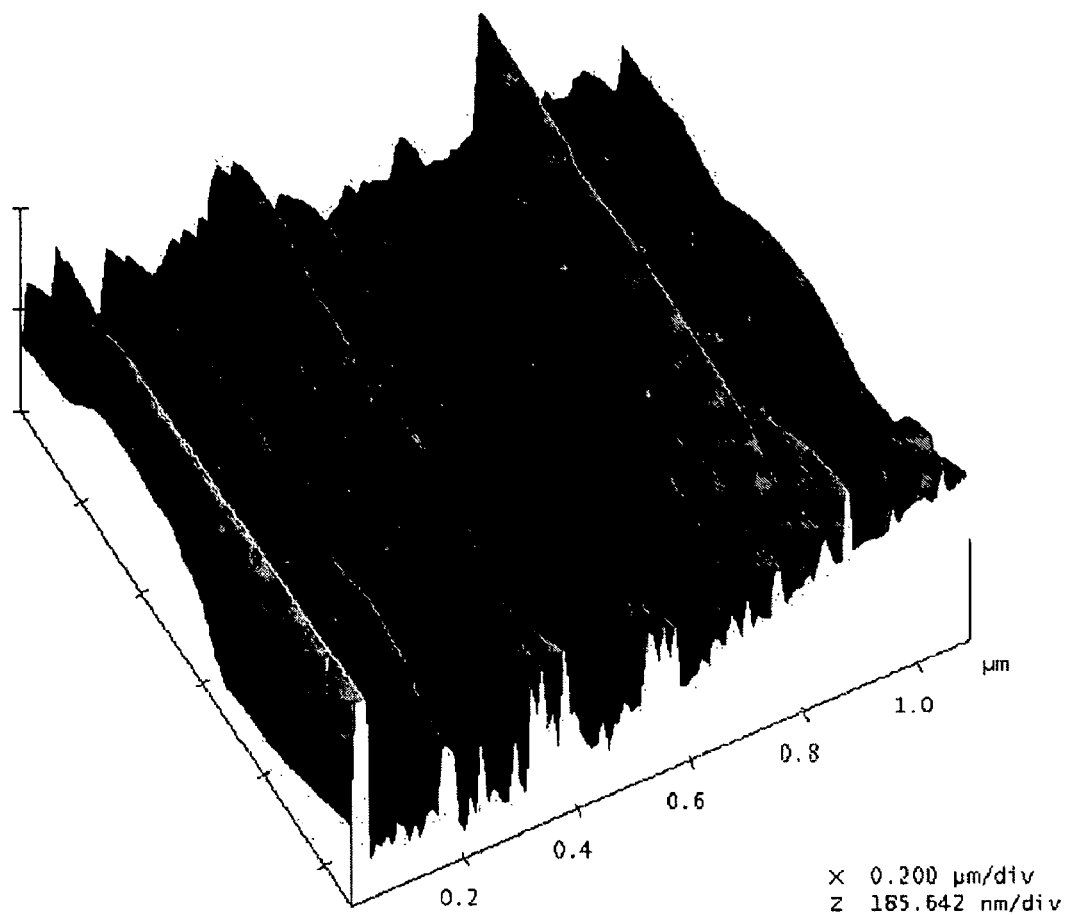
FIG. 3 Selected atomic force micrographs of (a) NGPs, (b) nano-scaled graphite oxide platelets, and (c) nano-scaled molybdenum diselenide platelets.
Figure 3C:
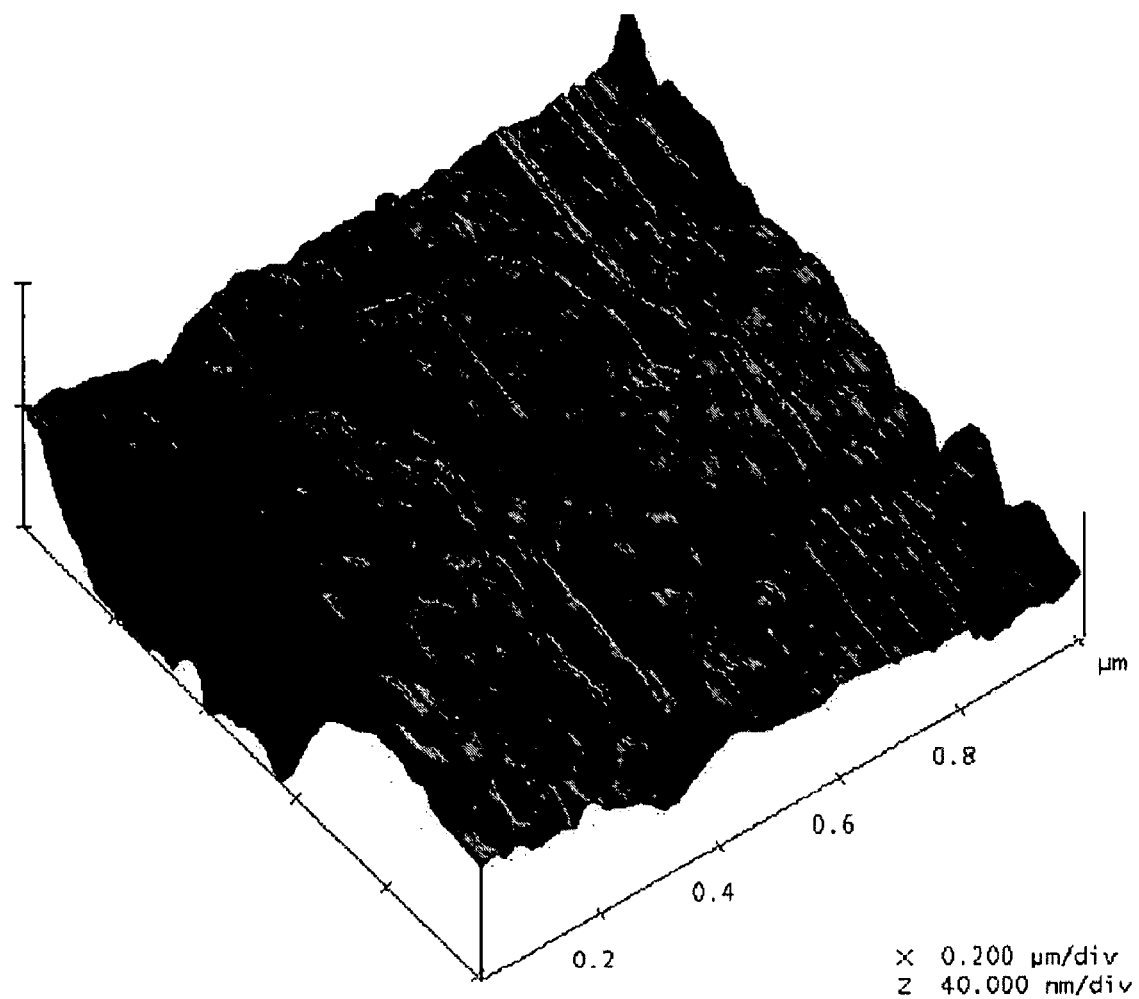

The above-described preferred embodiments of the presently invented method may be summarized in the flowchart of FIG. 2.

In prior art processes, for the purpose of exfoliating graphene plane layers, the chemical treatment of the graphite powder involves subjecting particles of a wide range of sizes to a chemical solution for periods of time typically up to several days. The chemical solution was selected from a variety of oxidizing solutions. Commonly used intercalation compounds are $H_2SO_4$, $HNO_3$, and $KM_nO_4$, ranging from about 0.1 normal to concentrated strengths. These strong acids are undesirable and, hence, the resulting exfoliated material has to be thoroughly washed, which is an expensive and lengthy process. In contrast, the presently invented method involves the utilization of halogen species which do not form a residue in the resulting platelets and these species can be readily recovered and re-sued.

Morrison, et al. [U.S. Pat. No. 4,822,590, Apr. 18, 1989] have disclosed a method of preparing single-layer materials of the form $MX_2$, where $MX_2$ is a transition metal layer-type dichalcogenide such as $MoS_2$, $TaS_2$, $WS_2$, and the like. The process involved intercalating the $MX_2$ with an alkali metal (e.g., lithium or sodium) in a dry environment for sufficient time to enable the lithium or sodium to substantially intercalate the $MX_2$. The lithium- or sodium-intercalated $MX_2$ is then immersed in water. The water reacts with the intercalated lithium or sodium and forms hydrogen gas between the layers of $MX_2$. The pressure of the evolved hydrogen gas causes the layers of $MX_2$ to exfoliate into single layers. This single layer $MX_2$ material may be useful as a coating and a lubricant. However, pure lithium and sodium must be handled with extreme care in an absolutely dry environment. With a melting point of 180.7° C., lithium will have to be intercalated into $MX_2$ at a high temperature in a completely water-free environment, which is not very conducive to mass production of exfoliated products. In contrast, the presently invented process does not involve a highly explosive chemical or a violent chemical reaction such as $2\ Li+2\ H_2O \rightarrow H_2+2Li^++2OH^-$.

The following examples serve to provide the best modes of practice for the present invention and should not be construed as limiting the scope of the invention:

Example 1

Nano-Scaled Graphene Platelets (NGPs) from Highly Oriented Pyrolytic Graphite (HOPG) Flakes One hundred grams of HOPG flakes, ground to approximately 20 µm or less in sizes, and a proper amount of bromine liquid were sealed in a two-chamber quartz tube (schematically shown in FIG. 1) with the HOPG chamber controlled at 25° C. and bromine at 20° C. for 48 hours to obtain a halogen-intercalated graphite compound.

Subsequently, approximately ⅔ of the intercalated compound was transferred to a furnace pre-set at a temperature of 200° C. for 30 seconds. The compound was found to induce extremely rapid and high expansions of graphite crystallites with an expansion ratio of greater than 300. The thickness of individual platelets ranged from single graphene sheet to approximately 2-20 graphene sheets. A small portion of the exfoliated graphite particles were then ball-milled in a high-energy plenary ball mill machine for 24 hours to produce nano-scaled particles with reduced length and width (now 0.5-2 µm).

Approximately 5 grams of the intercalated compound was added to 100 mL of water and a 0.2% by weight of a surfactant, sodium dodecylsulfate (SDS) to form a slurry, which was then subjected to ultrasonification at approximately 10° C. for one hour. Well-separated and dispersed nano-scaled graphite platelets were obtained, resulting in the formation of a stable dispersion (suspension). A water-soluble polymer, polyethylene glycol (1% by weight), was then added to the suspension. Water was later vaporized, resulting in a nanocomposite containing NGPs dispersed in a polymer matrix.

Example 2

NGPs from Short Carbon Fiber Segments

The procedure was similar to that used in Example 1, but the starting material was carbon fibers chopped into segments with 0.2 mm or smaller in length prior to the halogen vapor ($Br_2$) intercalation treatment. The diameter of carbon fibers was approximately 12 μm. Great expansions were achieved after exposure to heat at 200° C.

Example 3

NGPs from Graphitic Nano-Fibers (GNFs)

A powder sample of graphitic nano-fibers was prepared by introducing an ethylene gas through a quartz tube pre-set at a temperature of approximately 800° C. Also contained in the tube was a small amount of nano-scaled Cu—Ni powder supported on a crucible to serve as a catalyst, which promoted the decomposition of the hydrocarbon gas and growth of GNFs. Approximately 2.5 grams of GNFs (diameter of 10 to 80 nm) were intercalated with ICl vapor at 70° C. for 48 hours. The sample was then heated to approximately 250° C. to effect rapid exfoliation.

Example 4

Microwave Heating

Same as in Example 3, but heating was accomplished by placing the intercalated sample in a microwave oven using a high-power mode for 3-10 minutes. Very uniform exfoliation was obtained.

Example 5

Preparation of Molybdenum Diselenide Nanostructured Materials

The same sequence of steps can be utilized to form nano platelets from other layered compounds: halogen intercalation and exfoliation, followed by ball milling or ultrasonication. Dichalcogenides, such as $MoS_2$, have found applications as electrodes in lithium ion batteries and as hydrodesulfurization catalysts. $MoSe_2$ consisting of Se—Mo—Se layers held together by weak van der Waals forces can be exfoliated via the presently invented method. Intercalation can be achieved by placing $MoSe_2$ powder in a sealed two-chamber ampoule, allowing either $Br_2$ or $PCl_3$ to completely intercalate into the van der Waals gap between Se—Mo—Se sheets. After heating at 250° C. for less than 30 seconds, the resulting $MoSe_2$ platelets were found to have a thickness in the range of approximately 1.4 nm to 13.5 nm with most of the platelets being mono-layers or double layers in both cases of $Br_2$ and $PCl_3$ intercalations.

Other single-layer platelets of the form $MX_2$ (transition metal dichalcogenide), including $MoS_2$, $TaS_2$, and $WS_2$, were similarly intercalated by both IBr and $PBr_3$, at 70° C. and 25° C., respectively, for one day and then exfoliated at 200° C. and 250° C., respectively. Again, most of the platelets were mono-layers or double layers. This observation clearly demonstrates the versatility of the presently invented method in terms of producing relatively uniform-thickness nano-scaled platelets.

Example 6

Graphite Oxide Nano Platelets and their Nanocomposites

Graphite oxide was prepared by oxidation of graphite flakes with sulfuric acid, nitrate, and permanganate according to the method of Hummers [U.S. Pat. No. 2,798,878, Jul. 9, 1957]. Upon completion of the reaction, the mixture was poured into deionized water and filtered. The graphite oxide was repeatedly washed in a 5% solution of HCl to remove most of the sulphate ions. The sample was then washed repeatedly with deionized water until the pH of the filtrate was neutral. The slurry was spray-dried and stored in a vacuum oven at 60° C. for 24 hours. The interlayer spacing of the resulting laminar graphite oxide was determined by the Debey-Scherrer X-ray technique to be approximately 0.73 nm (7.3 Å), which was found to be conducive to the intercalation by halogen vapor molecules.

Selected samples of graphite oxide (particle sizes of approximately 4.2 μm) were sealed in one chamber (at 20° C.) of an ampoule which also contains another bromine-filled chamber at 25° C. for 18 hours. The resulting bromine-intercalated graphite oxide was then transferred to a furnace pre-set at 250° C. to allow for exfoliation. Well separated graphite oxide nano platelets were obtained.

It is of great interest to note that, when mixed with water and a surfactant (Triton X-100) and subjected to a mild ultrasonic treatment after mixing, these nano platelets were well-dispersed in water, forming a stable water dispersion (suspension). Upon removal of water, the nano platelets settled to form an ultra-thin nano-carbon film, mat, or Bucky paper. Depending upon the volume fraction of nano platelets, the film could be as thin as one to ten graphite oxide layers (approximately 0.73 nm to 7.3 nm).

A small amount of water-soluble polymer (e.g., poly vinyl alcohol) was added to the nano platelet-water suspension with the polymer dissolved in water. The resulting nano platelet suspension with polymer-water solution as the dispersing medium was also very stable. Upon removal of water, polymer was precipitated out to form a thin coating on nano platelets. The resulting structure is a graphite oxide reinforced polymer nanocomposite.

A small amount of the nano platelet-water suspension was reduced with hydrazine hydrate at 100° C. for 24 hours. As the reduction process progressed, the brown-colored suspension of graphite oxides turned black, which appeared to become essentially graphite nano platelets or NGPs.

Another attempt was made to carry out the reduction of graphite oxide nano platelets prepared via the presently invented halogen intercalation and heat exfoliation. In this case, hydrazine hydrate reduction was conducted in the presence of poly (sodium 4-styrene sulfonate) (PSS with Mw=70,000 g/mole). A stable dispersion was obtained, which led to PSS-coated NGPs upon removal of water. This is another way of producing platelet-based nanocomposites.

Example 7

Clay Nano Platelets and Composites

Bentolite-L, hydrated aluminum silicate (bentonite clay) was obtained from Southern Clay Products. Bentolite clay (5 g) was subjected to intercalation by Br and BrF$_3$ at 40° C. and 50° C., respectively, for 48 hours. In each case, exfoliation was carried out by dispersing the intercalated compound sample in a beaker and then subjected to ultrasonication for one hour. The resulting clay nano platelets have a thickness in the range of approximately 2 to 30 nm. The technique used for nanocomposite preparation was melt mixing. The amounts of clay and epoxy were 0.1 g, and 0.9 g, respectively. The mixture was manually stirred for 30 min. When stirring, the sample was actually sheared or "kneaded" with a spatula or a pestle. A well dispersed clay nano platelet composite was obtained.

In conclusion, the presently invented method has many advantages over prior art methods of exfoliating layered materials for producing nano-scaled platelets. Summarized below are some of the more salient features or advantages:

(1) The present method is applicable to essentially all of the carbon- or graphite-based layered materials and all of the inorganic layered materials known to us. Thus far, no other method is so versatile or powerful.

(2) The present method does not utilize undesirable chemicals, does not require tedious washing steps, and does not produce contaminated waste water that would require costly disposal steps.

(3) The method does not involve a high exfoliation temperature (typically below 250° C.) and, hence, avoids undesirable high-temperature chemical reactions (e.g., avoids oxidation of graphite). When ultrasonic energy is used for exfoliating and separating nano platelets, the process is conducted at room temperature or lower. The intercalation does not involve a high pressure or a high temperature.

(4) Stable halogen-intercalated compounds can be conveniently exfoliated, separated, and dispersed in a liquid medium in one step when ultrasonication is utilized. This step is applicable to a wide range of liquid media (water, organic solvents, monomers, oligomers, etc.).

(5) This method is amenable to the preparation of various precursor forms (e.g., suspension, Bucky paper, mat, thin film, and lamina) to nanocomposites.

(6) The intercalating agents can be readily re-captured and re-used, thereby dramatically reducing any potential negative impact to environment.

(7) The stable intercalated compounds make it possible to conveniently exfoliate a laminar compound or element to produce nano-scaled platelets where and when these platelets are needed.

(8) With this method one can exercise a good control over the dimensions of nano platelets.

The invention claimed is:

1. A method of exfoliating a graphitic layered material to produce separated nano-scaled platelets having a thickness smaller than 100 nm, said method comprising:
a) subjecting said graphitic layered material to a halogen vapor at a first temperature above the melting point or sublimation point of said halogen with a sufficient halogen vapor pressure and for a duration of time sufficient to cause said halogen to penetrate an interlayer space of said layered material for forming a stable halogen-intercalated layered compound having a halogen concentration of at least 5% in terms of halogen-to-layered material atomic ratio, wherein said halogen has a boiling point above 0° C. and is selected from the group consisting of bromine trifluoride (BrF$_3$), chlorine trifluoride (ClF$_3$), phosphorus trichloride (PCl$_3$), phosphorus tetrachloride (P$_2$Cl$_4$), phosphorus tribromide (PBr$_3$), phosphorus triiodide (PI$_3$) and combinations thereof, or a combination of one or more thereof with diatomic halogen; and
b) heating said halogen-intercalated layered compound at a second temperature above the boiling point of said halogen, allowing halogen atoms or molecules residing in the interlayer space to exfoliate said layered material to produce the platelets, wherein the platelets are obtained by step (a) and (b) without mechanical attrition of the exfoliated platelets.

2. The method of claim 1 wherein said layered material comprises particles with a dimension smaller than 10 μm.

3. The method of claim 1 wherein said layered material comprises particles with a dimension smaller than 1 μm.

4. The method of claim 1 wherein said platelets have a thickness smaller than 10 nm.

5. The method of claim 1 wherein said platelets comprise single graphene or graphite oxide sheets.

6. The method of claim 1 further comprising a step of capturing at least a portion of said halogen molecules after exfoliation.

7. The method of claim 1 wherein said step of intercalation comprises enclosing said layered material in a first chamber and said halogen in a second chamber which is in vapor communication with said first chamber and wherein said second chamber is at a lower temperature than said first chamber.

8. The method of claim 1 wherein said layered material comprises natural graphite, synthetic graphite, highly oriented pyrolytic graphite, graphite oxide, graphite fluoride, pre-intercalated graphite, pre-intercalated graphite oxide, pre-intercalated graphite fluorite, graphite or carbon fiber, graphite nano-fiber, or a combination thereof.

9. The method of claim 1 wherein said heating step comprises placing said halogenintercalated compound in a heated zone of a furnace or subjecting said intercalated compound to microwave or dielectric heating.

10. The method of claim 1 further including a step of dispersing said platelets in a liquid to form a suspension or in a monomer- or polymer-containing liquid medium to form a nanocomposite precursor suspension.

11. The method of claim 10 further including a step of converting said suspension to a mat or paper, or converting said nanocomposite precursor suspension to a nanocomposite solid.

12. The method of claim 1 further including steps of mixing said platelets with a monomer or polymer to form a mixture and converting said mixture to obtain a nanocomposite solid.

13. The method of claim 10 wherein said platelets comprise graphite oxide or graphite fluoride platelets and said method further includes a step of partially or totally reducing said graphite oxide or graphite fluoride after the formation of said suspension.

14. The method of claim 1 wherein said halogen further comprises fluorine, chlorine, or a combination thereof as part of a mixture intercalant.

* * * * *